United States Patent
Khairmode et al.

(10) Patent No.: US 12,044,797 B2
(45) Date of Patent: Jul. 23, 2024

(54) OBJECT CLASSIFICATION USING MACHINE LEARNING

(71) Applicant: ATAI LABS PVT LTD., Hyderabad (IN)

(72) Inventors: Vijay Shankar Khairmode, Hyderabad (IN); Vamsikrishna Devara, Hyderabad (IN); Aanandh Suttamalli Balasubramanian, Hyderbad (IN); Vidya Manoher Bommena, Hyderabad (IN); Gangadhar Gude, Rangareddy (IN); Kishor Bulli Arumilli, Hyderabad (IN)

(73) Assignee: ATAI LABS PVT LTD., Hyderabad (IN)

( * ) Notice: Subject to any disclaimer, the term of this patent is extended or adjusted under 35 U.S.C. 154(b) by 474 days.

(21) Appl. No.: 17/418,743

(22) PCT Filed: Dec. 31, 2019

(86) PCT No.: PCT/IN2019/050969
§ 371 (c)(1),
(2) Date: Jun. 25, 2021

(87) PCT Pub. No.: WO2020/141549
PCT Pub. Date: Jul. 9, 2020

(65) Prior Publication Data
US 2022/0057486 A1 Feb. 24, 2022

(30) Foreign Application Priority Data

Dec. 31, 2018 (IN) .............................. 201841050102
Dec. 31, 2018 (IN) .............................. 201841050106

(51) Int. Cl.
*G01S 7/41* (2006.01)
*G01S 13/931* (2020.01)
*G06N 20/00* (2019.01)

(52) U.S. Cl.
CPC ............ *G01S 7/417* (2013.01); *G01S 13/931* (2013.01); *G06N 20/00* (2019.01)

(58) Field of Classification Search
CPC ........ G01S 7/417; G01S 13/931; G01S 13/89; G01S 7/41; G06N 20/00
See application file for complete search history.

(56) References Cited

U.S. PATENT DOCUMENTS 6,366,236 B1 4/2002 Farmer et al.
10,627,508 B2 4/2020 Kamo et al.
(Continued)

FOREIGN PATENT DOCUMENTS

CN 107180259 A 9/2017
DE 102018000880 B3 * 2/2019 ............. B60K 31/00
(Continued)

OTHER PUBLICATIONS

17418743_2023-11-01_DE_102018000880_B3_M.pdf, machine translation of DE-102018000880-B3 (Year: 2019).*
(Continued)

*Primary Examiner* — Timothy A Brainard
*Assistant Examiner* — Kenneth W Good
(74) *Attorney, Agent, or Firm* — Workman Nydegger

(57) ABSTRACT

Techniques of machine learning of a radar are disclosed, where the radar has a plurality of antennas that are arranged on an antenna array. In an example, a method of machine learning includes obtaining a real training sample from a first real target in field of view of the radar, where the real training sample includes a plurality of first real data signals, where each of the first real data signals are obtained from a
(Continued)

corresponding antenna from amongst the plurality of antennas. The method further includes deriving a synthetic training sample by manipulating the plurality of first real data signals to simulate a rotation of the first real target about a pre-determined axis of the antenna array.

20 Claims, 4 Drawing Sheets

(56) References Cited

U.S. PATENT DOCUMENTS

| | | |
|---|---|---|
| 2016/0019458 A1 | 1/2016 | Kaufhold |
| 2018/0341017 A1 | 11/2018 | Kamo et al. |
| 2019/0065637 A1* | 2/2019 | Bogdoll ................. G06N 20/00 |
| 2019/0370606 A1* | 12/2019 | Kehl ....................... G06V 10/82 |

FOREIGN PATENT DOCUMENTS

| | | |
|---|---|---|
| JP | 2003-507716 A | 2/2003 |
| RU | 2489753 C2 * | 8/2013 |

OTHER PUBLICATIONS

17418743_2023-11-01_RU_2489753_C2_M.pdf, machine translation of RU 2489753 C2 (Year: 2013).*
International Search Report and Written Opinion received for PCT Patent Application No. PCT/IN2019/050969, dated May 8, 2020, 8 pages.

* cited by examiner

OBJECT CLASSIFICATION USING MACHINE LEARNING

CROSS-REFERENCE TO RELATED APPLICATIONS

This application claims priority to PCT Application No. PCT/IN2019/050969, filed Dec. 31, 2019, entitled "OBJECT CLASSIFICATION USING MACHINE LEARNING", which claims the benefit of and priority to Indian Application No. 201841050106, filed Dec. 31, 2018 and Indian Application No. 20181050106, filed Dec. 31, 2018. Each of the aforementioned applications are incorporated by reference herein in their entirety.

TECHNICAL FIELD

The present subject matter relates, in general to machine learning, and in particular to machine learning for radars.

BACKGROUND

Object recognition or classification through machine learning is used in a wide variety of fields, such as autonomous vehicles, advanced driver-assistance systems (ADAS) applications like automobile parking assistance, robotics, drone etc., where obstacle or object detection and identification is required. The proper classification or identification of an obstacle or object may be vital for correct decision making such as taking evasive action to avoid collision, braking, overtaking, etc. Since camera based object classification is limited in their operation due to environmental conditions like rain, fog, etc., radar based object classification techniques are generally preferred for reliable operation in all conditions. Typically, for proper prediction of an object's class, machine learning systems need to be trained with a large number of samples. In addition, the training samples should be sufficiently varying so that the machine learning system can be adequately trained for differing input possibilities.

BRIEF DESCRIPTION OF THE DRAWINGS

The following detailed description references the drawings, wherein.

DETAILED DESCRIPTION

Figure 1:
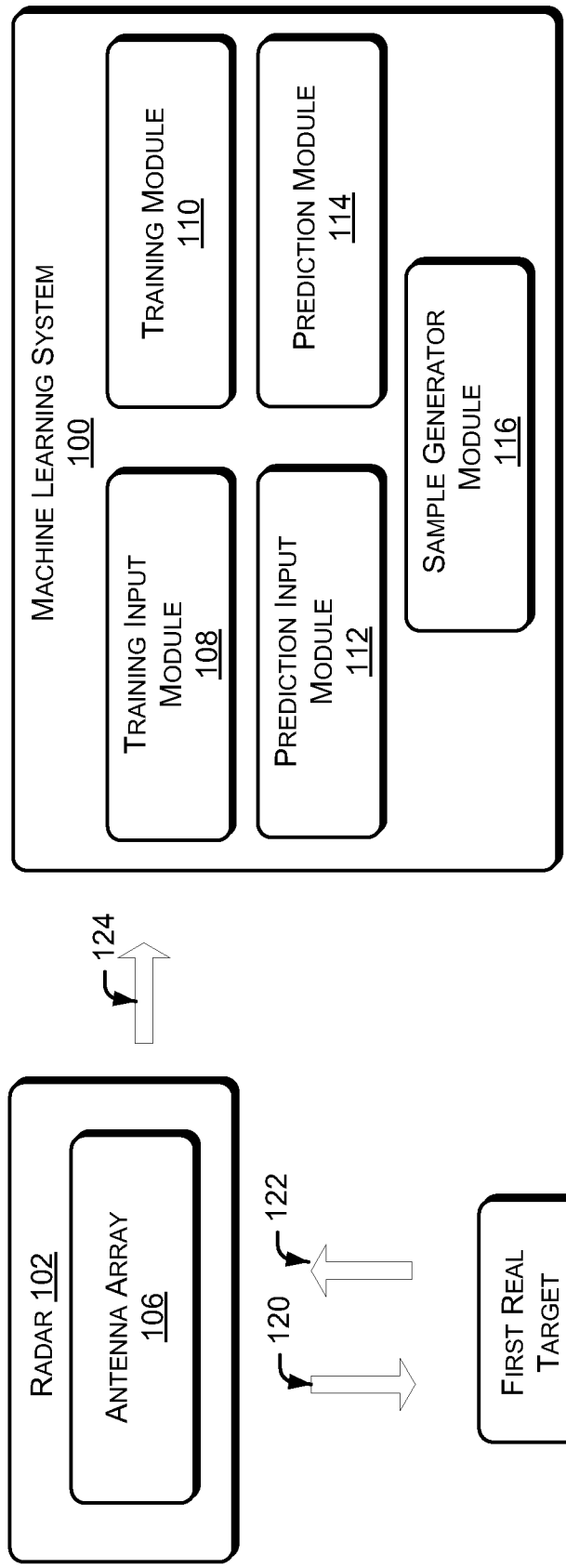
FIG. 1 a schematic representation of a machine learning system for a radar according to an implementation of the present subject matter.

The subject matter disclosed herein relates to machine learning for a radar. As mentioned previously, for ensuring a good prediction accuracy from a machine learning system, the training phase of the machine learning system should be conducted with an appropriately large number of training samples. This is in general true for any machine learning technique like support vector machines (SVM) and neural networks. However, more often than not, having a large number of training samples does not guarantee the desired sample variations. As a result, the training samples may have inherent biases within the training samples. In particular, for a machine learning based radar, the training samples may be associated with objects which were available only at certain angles with respect to the radar. To remove this angular bias in the training phase, the training samples for all objects to be classified should be taken at all possible angles. As can be understood, this may not be practically implementable or scalable. However, if the biases are not removed, the machine learning system may have inferior prediction capabilities.

Alternatively, input possibilities can be restricted in both training samples and prediction samples thus reducing the computation complexity as well as memory requirement of machine learning system. Also, all training and prediction samples may inherently have differing quality which gives rise to differing prediction accuracies. In case of Radar, as an example, received signal strength and signal to noise ratio are the measures of quality of the received signal. Due to antenna directivity, signal strength and signal to noise ratio varies for same object depending on the spatial orientation of the object with respect to the Radar. This gives rise to variation in prediction accuracies depending on the angle of arrival of the signal from the object to the radar.

Also, the signal strength and signal to noise ratio of the reflected radar signal varies depending on the angle of target with respect to the radar. This gives rise to variation in accuracies in machine learning system depending on the location of the object with respect to the radar.

To this end, the present subject matter describes systems and methods for machine learning for a radar.

As per an implementation of the present subject matter, a real training sample is obtained for a real target in the field of view of a radar having an antenna array. Antenna arrays typically have a plurality of antennas. The real training sample includes a plurality of real data signals obtained from the corresponding antenna. Synthetic training samples are then derived to simulate a rotation of the real target of the radar by manipulating the real data signals.

As can be seen, the present subject matter provides a technique to increase the training sample count by generating synthetic samples for training from existing real samples. Moreover, as the synthetic samples are rotated versions of the real samples, the angular biases are also reduced or removed.

Also, the present subject matter provides a technique to remove the variation in the signal strength and signal to noise ratio from sample to sample by creating a composite sample. Composite sample is seen by radar at zero-degree azimuth angle irrespective of real angle of object with respect to radar.

The above described machine learning for a radar is further described with reference to FIGS. 1 to 4. It should be noted that the description and figures merely illustrate the principles of the present subject matter along with examples described herein and, should not be construed as a limitation to the present subject matter. It is thus understood that various arrangements may be devised that, although not explicitly described or shown herein, include the principles of the present subject matter. Moreover, all statements herein reciting principles, aspects, and examples of the present subject matter, as well as examples thereof, are intended to encompass equivalents thereof.

FIG. 1 illustrates a schematic representation of a machine learning system 100 for a radar 102 according to an implementation of the present subject matter. The radar 102 includes an antenna array 106 having a plurality, N, of antennas (not shown in FIG. 1). The radar 102 may be, for example, a Frequency Modulated Continuous Wave (FMCW) Radar or Pulse Doppler Radar. In operation, the radar 102 interacts with a real target 104 in a field of view of the radar 102. The real target 104 may be an object or obstacle, like a car, a bike, a truck, a bicycle, a person etc. In an implementation, the real target 104 may be an object or obstacle for which a sample is to be obtained for training the machine learning system 100 during the training phase. In other implementations, the real target 104 may be an object or obstacle which has to be classified during a prediction phase of the machine learning system 100. Though, the machine learning system 100 is shown in FIG. 1 as separate from the radar 102, in other implementations of the present subject matter, the machine learning system 100 may be integrated with the radar 102 itself.

In some implementations, the N antennas of antenna array 106 may be positioned equidistant and linearly along a horizontal axis. The antennas transmit Radio Frequency (RF) signals towards the real target 104 and then receive the RF signal which is reflected back by the real target 104. As is generally known, the composition of the reflected RF signal 122 will not only depend on the reflectivity and structure of the surface of the real target 104 but also on the distance and the direction (angle) of the real target 104 with respect to the-antennas. Each antenna on receiving the reflected RF signal 122, generates an independent real data signal. Each of the real data signals also carry information about the nature, distance and direction of the real target 104.

Figure 2:
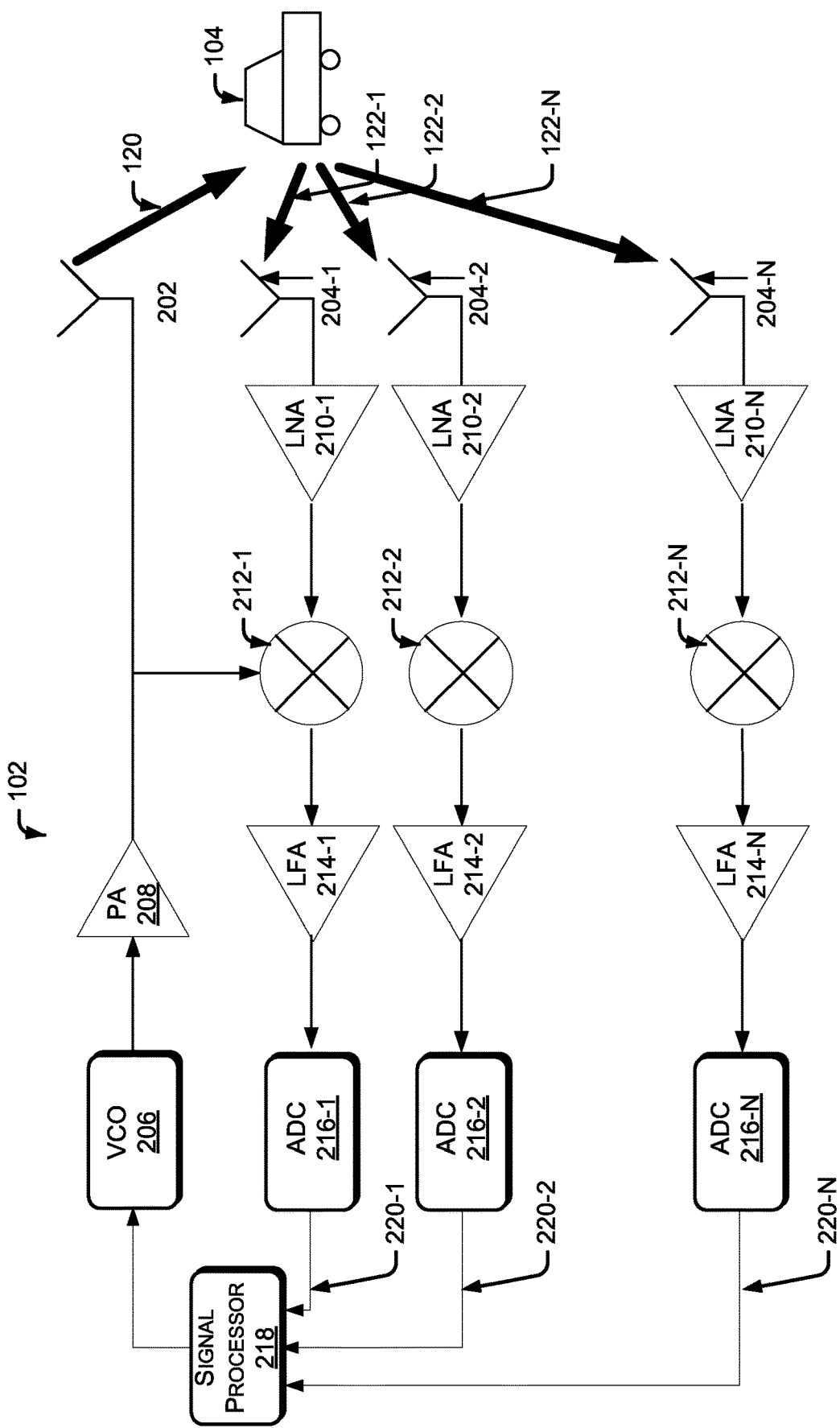
FIG. 2 is an illustration of the generation of the real data signals in an example implementation of the radar.

FIG. 2 is an illustration of the generation of the real data signals 220 in an example implementation of the radar 102. The radar 102 in FIG. 2 is based on FMCW. The radar 102 interacts with the real target 104, which in this case is a car, and the subsequently generates the real data signals 220. In this implementation, the antenna array 106 of the radar 102 has independent receiver antennas 204-1, 204-2, . . . , 204-N but a common transmitter antenna 202. In operation, the real target 104 receives a transmitted RF signal 120 from the transmitter antenna 202. The transmitted RF signal 122 then gets reflected off the surface of the real target 104. The reflected RF signal(s) 122-1, 122-N, . . . , 122-N are then received respectively by each of the receiver antennas 204-1, 204-2, . . . , 204-N of the antenna array 106. As is generally known for radar signalling, the reflected RF signals 122 are analog in nature. The reflected RF signals 122 may then be digitalized and discretized by the radar's 102 circuitry associated with each receiver antennas 204. As shown in FIG. 2, each receiver antenna 204-1, 204-2, . . . , 204-N is associated with a receiver chain which typically includes associated circuitry to process the corresponding received reflected RF signal 122-1, 122-N, . . . , 122-N. In this example, where the radar 102 is based on FMCW, the associated circuitry is known to include a low noise amplifier (LNA) 210, a mixer 212, a low frequency amplifier (LFA) 214 and an analog to digital converter (ADC) 216. In some implementations, the real data signals 220 may then be taken as the signal that is generated at the ADC 216, i.e. at the end of the receiver chain, for each receiver antenna 204. When taken at the output of the ADCs 216-1, 216-2, . . . , 216-N, the corresponding real data signals 220-1, 220-2, . . . , 220-N, may each be in the form of a time series data. Alternatively, the real data signals 220 may be taken as an FFT of the time series data available at the ADCs 216. This may be facilitated by a signal processor 218 of the radar 102. In general, the real data signal 220 may also be the data generated after any kind of processing of the time series data or the FFT of the time series data as long as the real data signals 220 continue conveying information about the direction of the real target 104.

Although the subject matter has been described above in the context of constituent antennas of the antenna array 106 having their own receiver antennas 204 and a common transmitter antenna 202, it will be understood that the subject matter may be extended to antenna arrays where each constituent antenna has their own receiver antenna 204 and transmitter antenna 202.

Coming back to FIG. 1 and the operation of the machine learning system 100, as per one implementation, the machine learning system 100 includes a training input module 108 and a sample generator module 116. As described earlier, the radar 102 may generate a plurality of real data signals 220. The plurality of real data signals 220 may form a real sample 124. In some implementations, the real sample 124 may be formed by a concatenation of the real data signals in the same order as the ordering of the antennas 204 within the antenna array 106. The real sample 124 may then be obtained by the training input module 108, for example, for the training phase of the machine learning system 100. In this case, the real sample 124 acts as a real training sample. Thereafter, the sample generator module 116 may derive a synthetic training sample by manipulating the real data signals 220 included in the real training sample so as to simulate a rotation of the real target 104. The rotation may be with respect to a pre-determined axis of the antenna array 106. For example, for antenna arrays 106 having antennas 204 positioned linearly, the pre-determined axis may be perpendicular to the horizontal axis of the antenna array 106 along which the constituent antennas 204 lie. In some implementations, the pre-determined axis may also pass through the centre of the antenna array 106.

Figure 3:
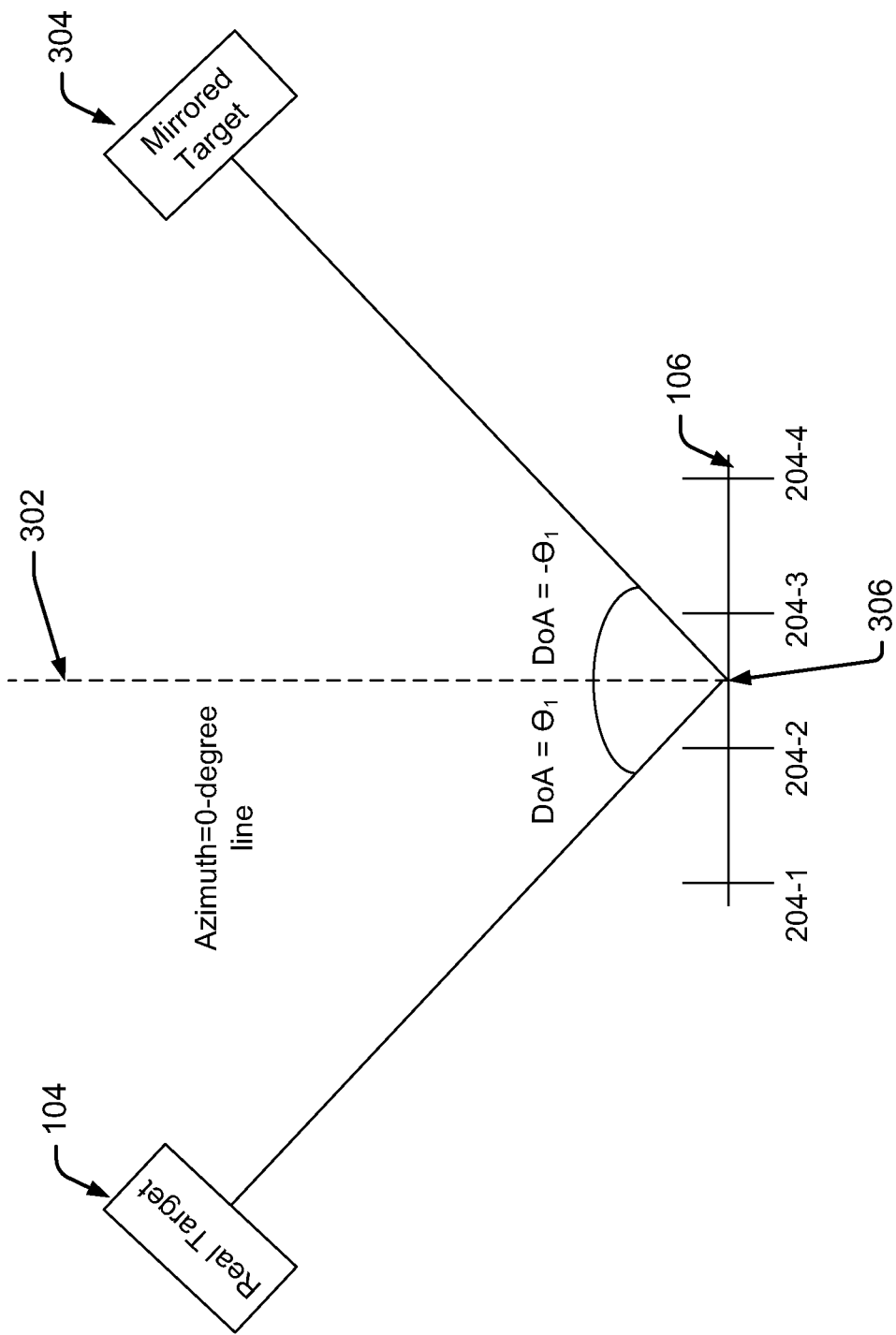
FIG. 3 illustrates a rotation achieved using the techniques of the present subject matter

FIG. 3 is an illustration of a rotation achieved using the techniques of the present subject matter. The illustration depicts an implementation of the present subject matter where the antenna array 106 has four antennas 204-1, 204-2, 204-3, 204-4 arranged equidistant linearly and the pre-determined axis 302 is perpendicular to the centre 306 of the antenna array 106. As shown in FIG. 3, the real target 104 makes an angle $\theta_1$ with the pre-determined axis 302. As mentioned earlier, the sample generator module 116 may simulate the rotation of the real target 104. In some implementations, the rotation may be simulated by a reordering of the real data signals 220 of the real training sample generated for the real target 104. For example, consider that the real data signal 220-1 generated at the first antenna is D1, the real data signal 220-2 generated at the second antenna is D2 and so on. The real training sample for the radar 102 shown in FIG. 3 may then be formed by concatenating the real data signals D1, D2, . . . , D4 and represented as a vector $(D_1, D_2, D_3, D_4)$. Had the real target 104 been present at an angle $-\theta_1$, indicated as a mirrored target 304 in FIG. 3, with the pre-determined axis 302, the real training sample generated by the radar 102 would have been given by the vector $(D_4, D_3, D_2, D_1)$. This results from the symmetry of the real target 104 and the mirrored target 304 about the pre-determined axis 302. Accordingly, the sample generator module 116 may generates a synthetic training sample vector as $(D_4, D_3, D_2, D_1)$, which is a reordering of the real training sample $(D_1, D_2, D_3, D_4)$, it can therefore be understood to correspond to a mirrored target 304. The mirrored target 304 is a mirror image of the real target 104. Alternatively, the synthetic training sample is a representation of the real target 104 rotated by $2\theta$.

As mentioned earlier, it is not feasible and scalable to arrange for the real target 104 to be physically present at such mirrored positions. However, the sample generator module 116, by a simple reordering of the zo sequence of real data signals 220, may simulate such rotations. Although the above subject matter has been explained in the context of FIG. 3 that depicts four antennas 204, it will be understood that the subject matter may be extended to any antenna array 106 having at least two antennas 204. In general, the vector for the real sample may be represented as the vector $(D_1, D_2, D_3, \ldots, D_N)$. The synthetic sample, which gives a simulated data signal corresponding to the mirror image of the real target 104, is then represented by the vector $(D_N, D_{N-1}, D_{N-2}, \ldots D_1)$. For implementations where the number N of antennas 204 is even, the manipulation by the sample generator module 116 may be viewed either as a reversal of the real data signals 220 or as a swapping of real data signal of the $1^{st}$ antenna with the $N^{th}$, the $2^{nd}$ antenna with the $(N-1)^{th}$ antenna and so on etc. If N is odd, then the only difference is that the data of the middle antenna, i.e. the $((N+1)/2)^{th}$ antenna, remains un-swapped.

In some implementations, other degrees of rotation may also be simulated. For example, the synthetic sample may be formed by shifting the real data signals 220 of the real sample 124 to the right by one position to give a synthetic sample with a vector like $(D_N, D_1, D_2, \ldots, D_{N-1})$. By effecting different degrees of rotation, a multitude of synthetic training samples with different directions of arrival (DoA) or angles can therefore be generated with the same real training sample. Using such synthetic training samples to train the radar 102 alleviates the angular biases inherent due to the direction of arrival (DoA) of the reflected RF signal 122 during training of the machine learning system 100.

Returning to FIG. 1, in some implementations of the present subject matter, the machine learning system 100 may further include a training module 110. During the training phase, the training module 110 may train the machine learning system 100 with the real training sample 124. The training module 110 may train the machine learning system 100 with the real training samples and the synthetic training samples derived by the sample generator module 116. As is typically understood for machine learning, the training of the machine learning system 100 should be commiserate with the accuracy and efficiency desired from the machine learning system 100. While the mechanisms described in the present subject matter provide a means to generate one or more synthetic training samples from a real training sample, it should be understood that the training may require a large enough set of real training samples to begin with. Accordingly, the machine learning system 100 may be trained with an adequate number of real training samples 124 and derived synthetic training samples. Using the set of derived synthetic training samples along with the set of real training samples for training will yield accuracies and efficiencies much better than that offered by using just the real training samples because of the reduction or removal in the angular biases inherent in set of the real training samples.

Following the completion of the training, which may typically happen offline, the machine learning system 100 may then be used for classifying objects in real time. For example, a driverless car system may use the radar to identify objects during overtaking or parking. Accordingly, in some implementations, the machine learning system 100 may further include a prediction input module 112 and a prediction module 114. In operation then, the real target 104 may again be presented to the radar 102. However, the machine learning system 100 performs prediction with the real sample 124 generated in this case. In this implementation, the prediction input module 112 obtains a real prediction sample for the real target 104, instead of the real training sample. The real prediction sample, similar to the real training sample, includes a plurality of real data signals 124. Each of the real data signals are obtained from the corresponding antenna 204 of the antenna array 106. Thereafter, the prediction module 114 may predict a class of the real target 104 using the real prediction sample. Appropriate training modules 110 and prediction module 114 may be used based on the implementation of the machine learning system 100. As mentioned earlier, the machine learning system 100 may be based on SVM, Neural Networks, etc.

The aforementioned implementations train the machine learning system 100 with a synthetic training sample in order to counter the angular bias resulting from a machine learning training conducted only with objects 104 present at limited orientations with respect to the radar 102. If all the objects used for training as well as the objects to be predicted were present at the same angle, there would be no angular biases in the training samples to begin with. Correspondingly, in some implementations, the angular bias may be removed by effecting a rotation of the real targets 104, for the training and the prediction phase, such that the orientation is the same for all real targets 104 with respect to the radar 102. This is represented in FIG. 4.

Figure 4:
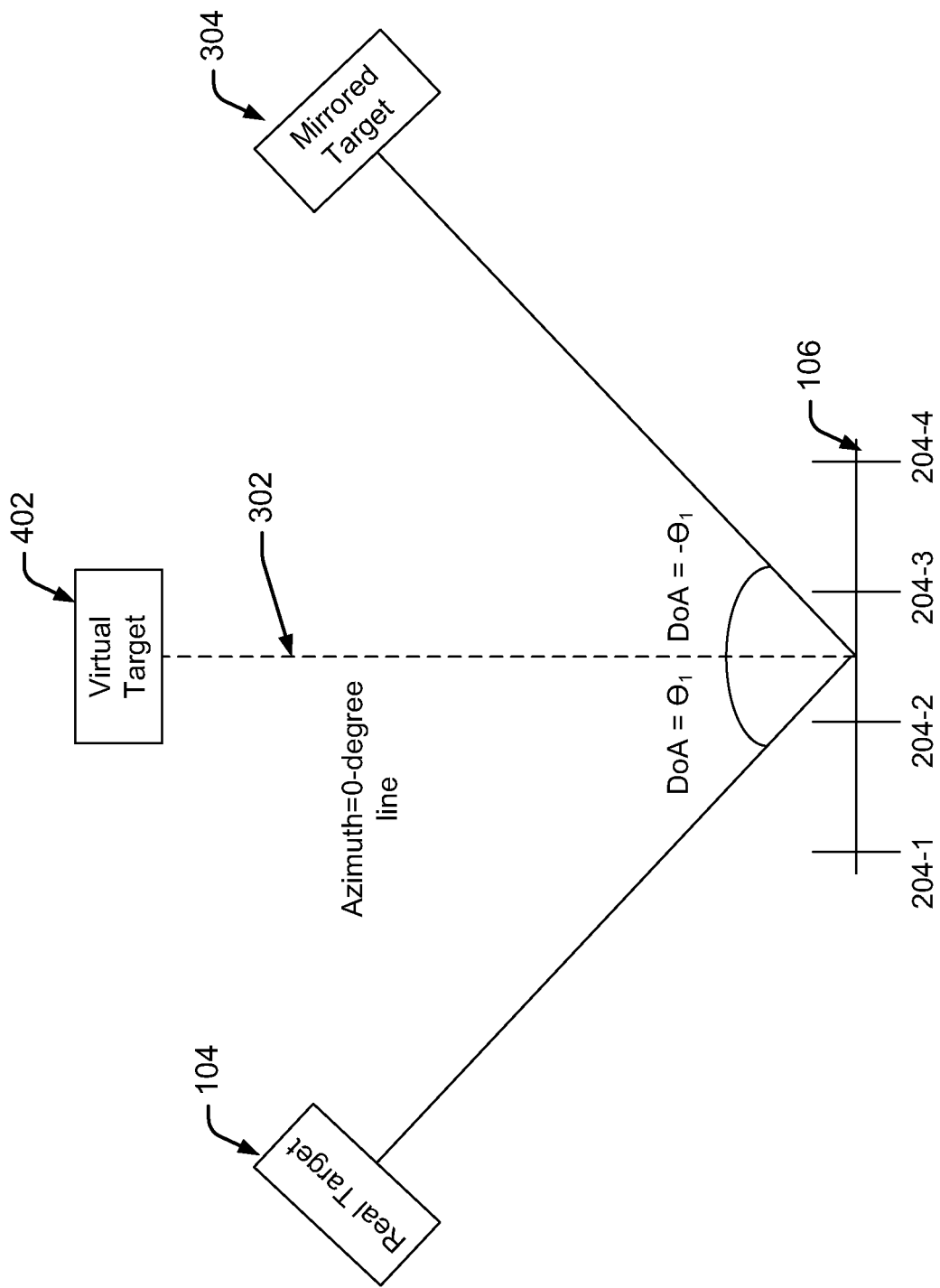
FIG. 4 illustrates an implementation of the present subject matter where a virtual target is present at zero-degree azimuth angle.

FIG. 4 represents an implementation of the present subject matter with a virtual target 402, corresponding to the real target 104 had it been present at zero-degree azimuth angle with respect to the pre-determined axis 302. The real sample 124 corresponding to the real target 104 had it been present at zero-degree azimuth angle would be achieved by adding, term by term, the samples corresponding to the real target 104 and mirrored target 304. For example, as shown before, the vectors for the real training sample and the synthetic training sample may be given by $(D_1, D_2, \ldots, D_{N-1}, D_N)$ and $(D_N, D_{N-1}, \ldots, D_2, D_1)$ respectively in some implementations. The vector representative of the virtual target 402 may then be given by $(D_1+D_N, D_2+D_{N-1}, \ldots D_{N-1}+D_2, D_N+D_1)$. Accordingly, in some implementations of the present subject matter, the sample generator module 116 may create a composite training sample by adding, term by term, the synthetic training sample to the real training sample. The composite training sample represents a virtual image of the real target 104 at zero-degree azimuth angle with respect to the pre-determined axis 302. The training module 108 may then train the machine learning system 100 with the composite training sample. In an implementation, the machine learning system 100 may be trained only with composite training samples. The real training samples and the synthetic training may not be used in such implementations for training purposes.

In addition, for such implementations, the real target 104 for prediction also needs to be transformed so that it appears to come along the zero-degree azimuth angle. Accordingly, the sample generator module 116 may additionally derive a synthetic prediction sample for the real target 104 whose class needs to be predicted. Similar to the synthetic training sample, the sample generator module 116 manipulates the plurality of real data signals 220 for a real target 104 for prediction to simulate a rotation of the real target 104 about the pre-determined axis 302 of the antenna array 106. The sample generator module 116 may then also create a composite prediction sample by adding, term by term, the synthetic prediction sample to the real prediction sample. The composite prediction sample then represents a virtual target 402 for prediction at zero-degree azimuth angle with respect to the pre-determined axis 302. For example, the vectors for the real prediction sample and the synthetic prediction sample may be given by $(P_1, P_2, \ldots, P_{N-1}, P_N)$ and $(P_N, P_{N-1}, \ldots, P_2, P_1)$ respectively. The vector for the virtual prediction sample for the virtual target may then be given by $(P_1+P_N, P_2+P_{N-1}, \ldots, P_{N-1}+P_2, P_N+P_1)$. The prediction module 114 may then be used to predict the class of the real target 104 using the composite prediction sample.

As can be seen, the vector corresponding to the virtual target 402 have some redundancies. For example, the $1^{st}$ and the $N^{th}$ term in the vector for the virtual target for training are both $D_1+D_N$, the $2^{nd}$ and the penultimate term are both $D_2+D_{N-1}$. Similar redundancies are present in the vectors for the virtual target for prediction. This redundancy can be leveraged by keeping only half the terms during the training and prediction phases. This allows for more efficient and accelerated learning rate for the machine learning system 100. Accordingly, in some implementations, if N is even, the sample generator module 116 creates the composite training sample by adding only the first N/2 data signals of the real training sample to the first N/2 data signals of the synthetic training sample, and the training module zo trains the radar comprises using only first N/2 data signals of the composite training sample to train the radar. If N is odd, the sample generator module creates the composite training sample by adding only the first (N+1)/2 data signals of the real training sample to the first (N+1)/2 data signals of the synthetic training sample. The training module trains the radar comprises using only the first (N+1)/2 data signals of composite training sample to train the radar.

In the above implementation, the composite samples retain only half the terms. However, other implementations may also be possible where the composite samples have fewer terms other than half as well.

Training samples are used for training of machine learning or deep learning algorithms. The said algorithms could be any of supervised type, unsupervised type, semi-supervised type, reinforcement type. Training can be done online or offline. Prediction samples are also used for prediction of the object class.

Radar can be any of the following types: bistatic radar, mono-static radar, continuous wave radar, frequency modulated continuous wave radar, pulse, radar, doppler radar, mono pulse radar, passive radar, planar array radar, pulse doppler radar, stepped frequency radar, synthetic aperture radar, over the horizon radar, PMCW radar, CDMA radar, OFDMA radar.

In an example of the present subject matter, the training sample is used for to train and prediction sample is used to predict the class of the object using machine learning or deep learning algorithms like Support Vector Machine, Linear Regression, Logistic Regression, K-Means, Gradient Boosting, Nearest Neighbour, Naïve Bayes, Decision Trees, Linear Regression, Random Forest, Neural Networks, Deep Neural Networks, Convolutional Neural Network.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A machine learning method for a radar having a plurality of antennas, N, arranged on an antenna array, the method comprising:

obtaining a real training sample from a first real target in field of view of the radar, wherein the real training sample includes a plurality of first real data signals, each of the first real data signals obtained from a corresponding antenna from amongst the plurality of antennas;

deriving a synthetic training sample by manipulating the plurality of first real data signals to simulate a rotation of the first real target about a pre-determined axis of the antenna array; wherein if N is even,
      creating the composite training sample comprises adding only the first N/2 data signals of the real training sample to the first N/2 data signals of the synthetic training sample, and
      training the radar comprises using only first N/2 data signals of the composite training sample to train the radar; and if N is odd,
      creating the composite training sample comprises adding only the first (N+1)/2 data signals of the real training sample to the first (N+1)/2 data signals of the synthetic training sample, and
      training the radar comprises using only the first (N+1)/2 data signals of composite training sample to train the radar.

2. The method as claimed in claim 1, wherein the method comprises training the radar using the synthetic training sample.

3. The method as claimed in claim 2, the method comprising:

creating a composite training sample by adding the synthetic training sample to the real training sample, the composite training sample representing a virtual training sample at zero- degree azimuth angle with respect to the pre-determined axis; and training the radar using the composite training sample.

4. The method as claimed in claim 1, further comprising training the radar using the real training sample.

5. The method as claimed in claim 4, wherein the plurality of first real data signals are formed by concatenation of one of:

a time series data generated by each of the plurality of antennas, an FFT of the time series data generated by each of the plurality of antennas, data generated after processing the time series data generated by each of the plurality of antennas, and data generated after processing the FFT of the time series data generated by each of the plurality of antennas.

6. The method as claimed in claim 1, wherein the rotation of the first real target is simulated by reordering the plurality of first real data signals.

7. The method as claimed in claim 6, wherein obtaining the real training sample includes concatenating the first real data signal obtained from each antenna in an order same as the ordering of the plurality of antennas in the antenna array.

8. The method as claimed in claim 2, wherein deriving the synthetic training sample includes concatenating the first real signals obtained from each antenna in an order reverse as the ordering of the plurality of antennas in the antenna array.

9. A machine learning system for a radar, the radar having a plurality of antennas, N, arranged on an antenna array, the system comprising:

a training input module to obtain a real training sample from a first real target in field of view of the radar, wherein the real training sample includes a plurality of first real data signals, each of the first real data signals obtained from a corresponding antenna from amongst the plurality of antennas; and a sample generator module to derive a synthetic training sample by manipulating the plurality of first real data signals to simulate a rotation of the first real target about a pre-determined axis of the antenna array; wherein if N is even,
the sample generator module creates the composite training sample by adding only the first N/2 data signals of the real training sample to the first N/2 data signals of the synthetic training sample, and
the training module trains the radar comprises using only first N/2 data signals of the composite training sample to train the radar; and if N is odd,
the sample generator module creates the composite training sample by adding only the first (N+1)/2 data signals of the real training sample to the first (N+1)/2 data signals of the synthetic training sample, and
the training module trains the radar comprises using only the first (N+1)/2 data signals of composite training sample to train the radar.

10. The system as claimed in 9, the system comprising:
a training module to train the radar using the synthetic training sample.

11. The system as claimed in claim 9, the system further comprising:
a prediction input module to obtain a real prediction sample from a second real target in field of view of the radar, wherein the real prediction sample comprises a plurality of second real data signals, each of the second real data signals obtained from a corresponding antenna from amongst the plurality of antennas; and
a prediction module to predict a class of the second real target using the real prediction sample.

12. The system as claimed in claim 9, the system comprising:
the sample generator module to create a composite training sample by adding the synthetic training sample to the real training sample, the composite training sample representing a virtual training sample at zero-degree azimuth angle with respect to the pre- determined axis; and
a training module to train the radar using the composite training sample.

13. The system as claimed in claim 9, wherein the training module is to further train the radar using the real training sample.

14. The system as claimed in claim 11, wherein the sample generator module is configured to:
derive a synthetic prediction sample by manipulating the plurality of second real data signals to simulate a rotation of the second real target about the pre-determined axis of the antenna array;
create a composite prediction sample by adding the synthetic prediction sample to the real prediction sample, the composite prediction sample representing a virtual prediction sample object at zero-degree azimuth angle with respect to the pre-determined axis; and
a prediction module to predict a class of the second real target using the composite prediction sample.

15. The system as claimed in 9, wherein the plurality of first real data signals are formed by concatenation of one of:
a time series data generated by each of the plurality of antennas,
an FFT of the time series data generated by each of the plurality of antennas,
data generated after processing a time series data generated by each of the plurality of antennas, and
data generated after processing a FFT of a time series data generated by each of the plurality of antennas.

16. The system as claimed 15, wherein the rotation of the first real target is simulated by reordering the plurality of first real data signals.

17. The system as claimed in claim 11, wherein a rotation of the second real target is simulated by reordering the plurality of second real data in the manner of the reordering of the plurality of first real data signals.

18. The system as claimed in claim 9, wherein to obtain the real training sample, the training input module concatenates the first real data signal obtained from each antenna in an order same as the ordering of the plurality of antennas in the antenna array.

19. The system as claimed in claim 9, wherein to derive the synthetic training sample, the sample generator module concatenates the first real data signal obtained from each antenna in an order reverse as the ordering of the plurality of antennas in the antenna array.

20. The system as claimed in claim 14, wherein
if N is even,
the sample generator module creates the composite prediction sample by adding only the first N/2 data signals of the real prediction sample to the first N/2 data signals of the synthetic prediction sample, and
the training module trains the radar comprises using only first N/2 data signals of the composite training sample to train the radar; and if N is odd,
the sample generator module creates the composite prediction sample by adding only the first (N+1)/2 data signals of the real prediction sample to the first (N+1)/2 data signals of the synthetic prediction sample, and
the training module trains the radar comprises using only the first (N+1)/2 data signals of composite training sample to train the radar.

* * * * *